United States Patent
Ashizaki et al.

(10) Patent No.: US 7,129,007 B2
(45) Date of Patent: Oct. 31, 2006

(54) RECORDING MEDIUM FOR HOLOGRAM, HOLOGRAM RECORDING APPARATUS AND HOLOGRAM RECORDING METHOD

(75) Inventors: Koji Ashizaki, Tokyo (JP); Nobuhiro Kihara, Kanagawa (JP); Akira Shirakura, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/204,471

(22) PCT Filed: Feb. 19, 2001

(86) PCT No.: PCT/JP01/01164

§ 371 (c)(1),
(2), (4) Date: Jan. 27, 2003

(87) PCT Pub. No.: WO01/61420

PCT Pub. Date: Aug. 23, 2001

(65) Prior Publication Data

US 2003/0148192 A1   Aug. 7, 2003

(30) Foreign Application Priority Data

Feb. 21, 2000   (JP) ............................. 2000-048987

(51) Int. Cl.
   *G03H 1/04* (2006.01)
(52) U.S. Cl. .................... 430/1; 430/2; 359/3; 359/22; 359/24
(58) Field of Classification Search .................... 430/1, 430/2; 359/3, 22, 24
See application file for complete search history.

(56) References Cited

U.S. PATENT DOCUMENTS

| | | | | |
|---|---|---|---|---|
| 3,627,579 | A | * | 12/1971 | Heffelfinger ................. 428/356 |
| 5,435,963 | A | * | 7/1995 | Rackovan et al. .......... 264/509 |
| 5,631,107 | A | | 5/1997 | Tarumi et al. ................. 430/1 |
| 5,812,233 | A | * | 9/1998 | Walsh et al. ................. 349/194 |
| 5,843,598 | A | * | 12/1998 | Ueda et al. ..................... 430/2 |
| 5,985,490 | A | * | 11/1999 | Suga et al. ..................... 430/2 |
| 6,127,066 | A | * | 10/2000 | Ueda et al. ..................... 430/1 |
| 6,307,198 | B1 | * | 10/2001 | Asakura et al. ......... 250/227.25 |
| 6,878,493 | B1 | * | 4/2005 | Ueda et al. ..................... 430/1 |

FOREIGN PATENT DOCUMENTS

| | | |
|---|---|---|
| EP | 0 824 230 A2 | 2/1998 |
| JP | 06-138803  * | 5/1994 |
| JP | 7-114329 | 5/1995 |
| JP | 8-36351 | 2/1996 |

(Continued)

OTHER PUBLICATIONS

Merck Index, Tenth Ed. (1983) citations 7439-7444.*

(Continued)

*Primary Examiner*—Martin Angebranndt
(74) *Attorney, Agent, or Firm*—Rader, Fishman & Grauer PLLC; Ronald P. Kananen

(57) ABSTRACT

A recording medium (1) for hologram comprises a hologram recording layer (3) comprised of photo-polymer layer is formed on a base (2) comprised of colorless and transparent resin film, etc. and a protective layer (4) comprised of colorless and transparent resin film, etc. formed on the hologram recording layer (3). As such base (2) and protective layer (4), material having less double refraction is used. Optical axis of double refraction when such components are configured to be strip-shaped is allowed to be a direction of the longer side or a direction of the shorter side.

3 Claims, 11 Drawing Sheets

FOREIGN PATENT DOCUMENTS

| JP | 08-086915 | * | 4/1996 |
|---|---|---|---|
| JP | 10-20752 | | 1/1998 |
| JP | 2000-56663 | | 2/2000 |
| JP | 2000-338844 | * | 12/2000 |

OTHER PUBLICATIONS

Machine translation of JP 07-114329.*
Machine translation of JP 2000-056663.*
Machine translation of JP10-020752.*

Translation of PCT International Preliminary Examination Report Jun. 14, 2002.

International Search Report.

Hiroyuki Mori, et al., "Development of Wide View SA, A Film Product Widening the Viewing Angle of LCDS", Fujifilm Research & Development (No. 46-2001), pp. 51-55, no date.

http://www.fujifilm.co.jp/corporate/jobs/aboutus/technology/01/review0107,html, pp. 1-7, no date.

* cited by examiner

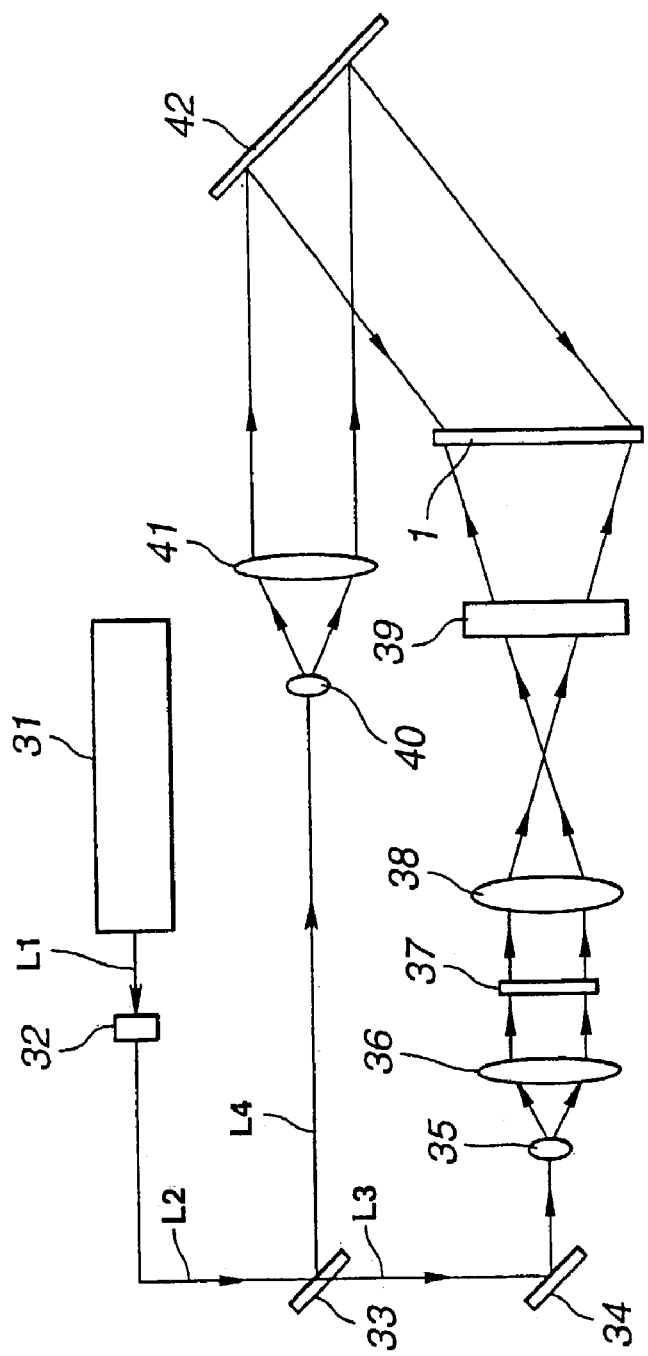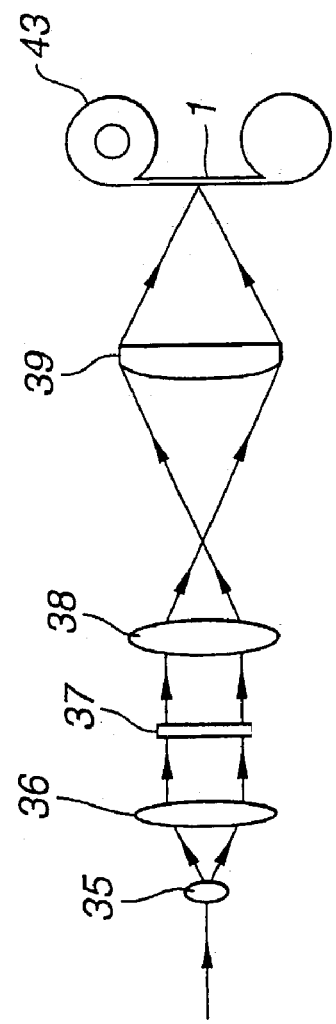
FIG.8A　　　FIG.8B

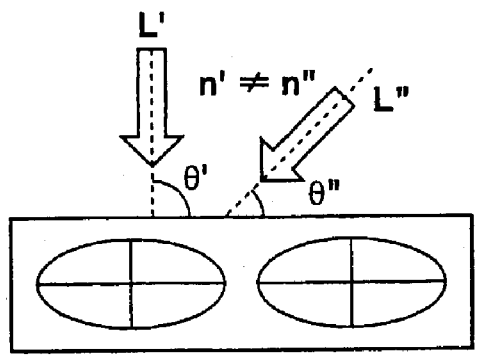
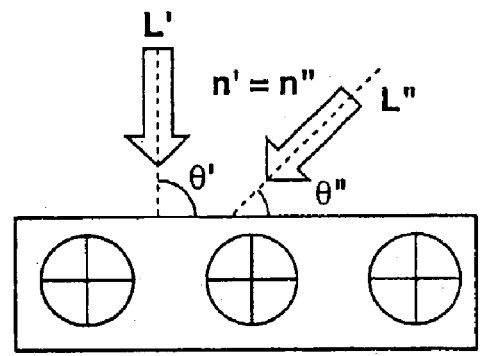
FIG.10A  FIG.10B

RECORDING MEDIUM FOR HOLOGRAM, HOLOGRAM RECORDING APPARATUS AND HOLOGRAM RECORDING METHOD

TECHNICAL FIELD

The present invention relates to a recording medium for hologram, and more particularly to a recording medium for hologram of the type in which hologram recording layer comprised of photo-polymer layer is configured to be put between protective layer and base. Further, the present invention relates to a hologram recording apparatus and a hologram recording method for recording hologram onto a recording medium for hologram.

BACKGROUND ART

Holographic stereogram is prepared, e.g., by recording, in succession, onto single recording medium for hologram as strip-shaped or dot-shaped element hologram, a large number of pictures, as original picture, which are obtained by successively photographing object from different points of observation.

For example, in preparing holographic stereogram having parallax information only in the lateral direction, such an approach is employed as shown in FIG. 1 to first photograph in succession object 100 from different points of observation in the lateral direction to thereby obtain parallax picture train 101 consisting of plural pictures having parallax information in the lateral direction. It is to be noted that it is sufficient that such parallax picture train 101 is not picture obtained by actually photographing object, but may be, e.g., CAD (Computer Aided Design) picture or CG (Computer Graphics) picture generated by computer etc. Further, respective pictures 102 constituting this parallax picture train 101 are recorded in succession onto a recording medium 103 for hologram as strip-shaped element hologram in such a manner that they are successive in the lateral direction. Thus, holographic stereogram having parallax information in the lateral direction can be obtained.

In this holographic stereogram, since information of plural pictures 102 obtained by successively photographing object 100 from different points of observation in the lateral direction are recorded in succession in such a manner that they are successive in the lateral direction as strip-shaped element hologram, when observer looks at this holographic stereogram by the both eyes, two-dimensional picture images respectively imaged on his left and right eyes are different. Thus, the observer feels parallax so that three-dimensional picture image is reproduced.

Meanwhile, element holograms of the above-mentioned holographic stereogram are recorded onto recording medium for hologram using photosensitive material as recording material in a manner stated below. Namely, in recording element holograms onto the recording medium for hologram, laser beams of good coherence are branched, and one branched laser beam is irradiated in a manner perpendicular to one surface of the recording medium for hologram as projected image (object light) which has been configured to undergo two-dimensional picture modulation by picture display means, e.g., liquid crystal panel, etc. Further, the other branched laser beam is irradiated at a predetermined angle onto the other surface of the recording medium for hologram as reference light. Thus, interference patterns are formed as a change of refractive index or transmission factor at the photosensitive material of the recording medium for hologram so that element holograms are recorded.

As a recording medium for a hologram, there may be used, e.g., a recording medium of the type in which a hologram recording layer consisting of photosensitive material such as photo-polymer, etc. is configured to be put between the protective layer and the base. The object light and the reference light are irradiated in the state of linear polarization from one surface and the other surface of the hologram recording layer to form interference patterns to record element holograms. It is to be noted that the photosensitive material of the hologram recording layer is not limited to photo-polymer, but there may be used other photosensitive material, e.g., silver salt material or gelatin bichromate, etc.

As the protective layer and the base of such recording medium for hologram, the so-called optical material such as optically transparent resin or glass, etc. is used. Further, as such protective layer and base, there is exemplified, e.g., transparent resin plate of such as polycarbonate, polyolefin, PMMA (polymethyl methacrylate), etc. as described in the Japanese Patent Publication No. H6-214117. Furthermore, there are exemplified PMMA (polymethyl methacrylate), polycarbonate, polyolefin, diethylene glycol bisallyl carbonate, polystyrene, hard polyvinyl chloride, methylmethacrylate-styrene copolymer resin, styrene-acrylonitrile copolymer resin, and poly (4-methylpentene-1), etc., as described in the Japanese Patent Publication No. H10-119163. Further, Japanese Patent Publication No. 11-338336 discloses as examples silicon compositions, etc. of condensation reactive type, addition reactive type, non-solvent type, ultraviolet hardening type and electron beam hardening type, etc.

In addition, as structure of hologram recording medium including hologram recording layer consisting of photo-polymer layer serving as photosensitive material as described above, there are, as the structure already announced, "Stephen A. Zager and Andrew M. Weber, "Display holograms in Du Pont's Ommidex films", Proc. of SPIE, Vol. 1461 (1991) pages 58–67 [DuPont]", "T. J. Trout, W. J. Gambogi and S. H. Stevenson, "Photopolymer Materials for Color Holography", Proc. SPIE, Vol. 2577 (1995) pages 94–105", "Sylvia H. Stevenson, "DuPont multicolor holographic recording films", Proc. of SPIE, Vol. 3011 (1997)", "Masami Kawabata, Akihiko Sato, Iwao Sumiyosi and Toshihiro Kubota, "Photopolymer system and its application to a color hologram" Applied Optics, Vol. 33, No. 11 (Apr. 10, 1994) pages 2152–2156", etc.

However, optical materials having small difference between refractive indexes of double refraction are expensive. Further, according as double refraction becomes smaller or lesser, materials are limited, resulting in higher cost.

As described above, object light and reference light are incident on the hologram recording layer as linearly polarized light to form interference patterns. However, when there is double refraction characteristic (birefringence) in the base or the protective layer, plane of polarization becomes oblique or changes into elliptically polarized light when such light is passed (transmitted) through the base or the protective layer. For this reason, contrast of interference pattern within the hologram recording layer is lowered.

As a method of solving such a phenomenon, there is mentioned a method of reducing retardation which is one of index values of double refraction, i.e., reducing difference between refractive index in the direction in parallel to the optical axis and refractive index in the direction perpendicular to the optical axis as described in the Japanese Patent Publication No. H7-114329, for example.

However, optical materials having small difference between refractive indexes of doble refraction are expensive.; Further, according as double refraction becomes smaller or lesser, materials are limited, resulting in higher cost.

In addition, in development and fixing of photosensitive material such as silver salt material, gelatin bichromate, photo-polymer, etc. used in the hologram recording layer, development process and fixing process are carried out by acid/alkali, ultraviolet ray/visible ray/infrared ray, heat of high temperature or combination thereof, etc.

Under such circumstances, optical materials used in the protective layer and the base are also required to have various resistances or tolerances, e.g., chemicals resisting property such as acid resistance or alkali resistance, etc., water proof property such as moisture proof property or swelling proof property, etc., light proof property such as yellowing proof property, etc., weathering resistance property such as heat resistance property or yellowing resistance property, etc.

Accordingly, optical materials having less double refraction and provided with the above-mentioned resistances are limited and are therefore very expensive.

DISCLOSURE OF THE INVENTION

The present invention has been proposed in view of actual circumstances and is directed to a recording-medium for hologram in which projected light of a picture image and reference light are irradiated onto a hologram recording layer to thereby record the hologram, wherein a base and a protective layer of the hologram recording layer comprise with material having less double refraction.

Further, a hologram recording apparatus according to the present invention is directed to a hologram recording apparatus adapted for irradiating projected light of picture image and reference light onto a hologram recording layer to thereby record hologram, wherein axial direction of double refraction of base and protective layer of the hologram recording layer is configured to be coincided with polarization of the reference light and object light.

In addition, a hologram recording method according to the present invention is directed to a hologram recording method for irradiating projected light and reference light of a picture image onto a hologram recording layer to thereby record hologram, wherein axial direction of double refraction of a base and a protective layer of the hologram recording layer coincides with polarized light of the reference light and object light.

Still further objects of the present invention and more practical merits obtained by the present invention will become more apparent from the description of the embodiments which will be given below.

BRIEF DESCRIPTION OF THE DRAWINGS

FIG. 8A is a view for explaining the configuration of exposure processing unit in the above-mentioned holographic stereogram preparing apparatus, wherein the entire optical system is viewed from the upward direction.

FIG. 8B is a view for explaining the configuration of exposure processing unit in the above-mentioned holographic stereogram preparing apparatus, wherein the portion for object light of the optical system is viewed from lateral direction.

FIGS. 10A and 10B are views for explaining states of double refraction in the case where laser beams are obliquely incident and in the case where laser beams are perpendicularly incident.

BEST MODE FOR CARRYING OUT THE INVENTION

Preferred embodiments of the present invention will now be described with reference to the attached drawings. It should be noted that the present invention is not limited to the following examples, and it is therefore needless to say that modification/change may be made within the range which does not depart from the gist of the present invention.

Figure 1:
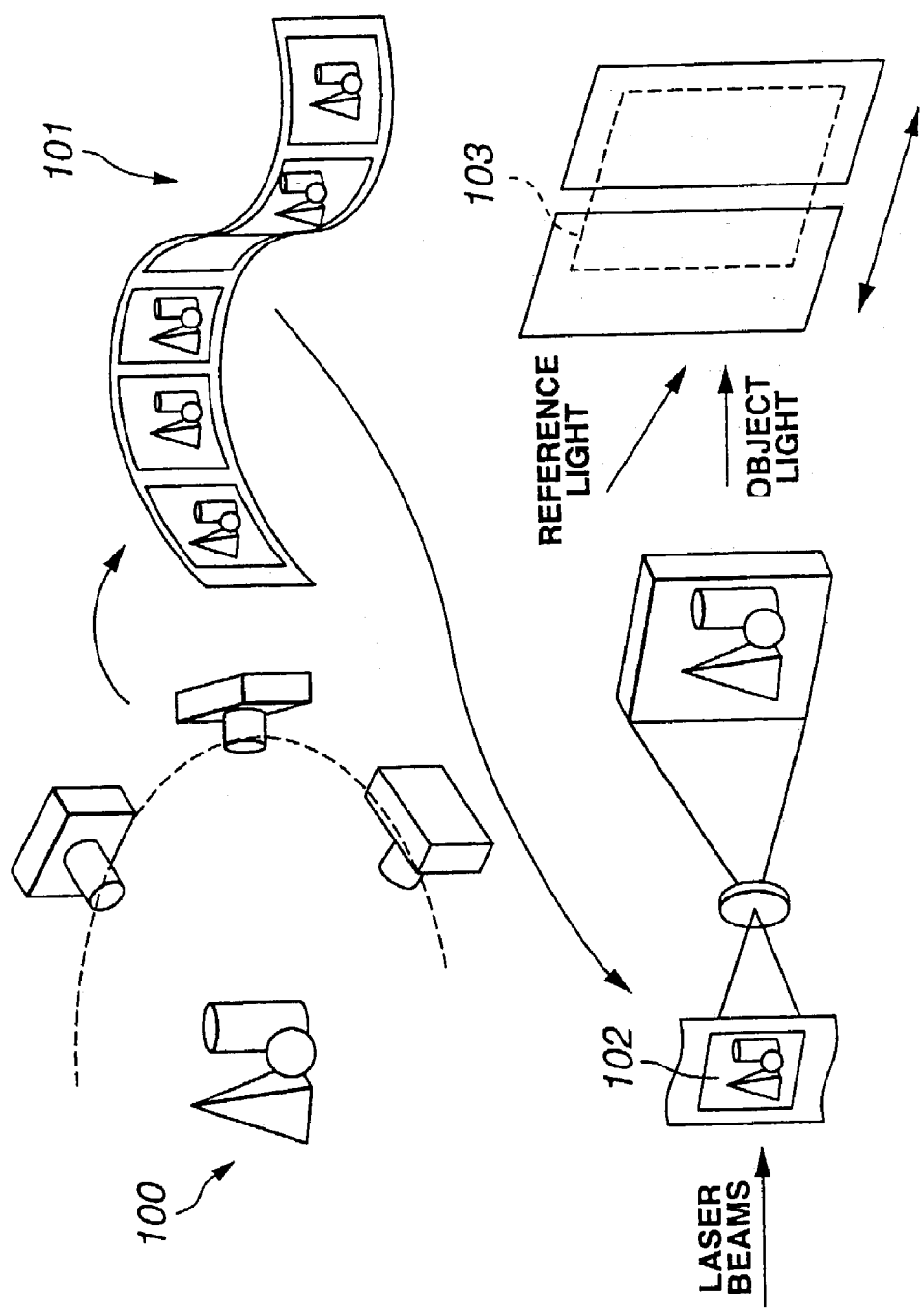
FIG. 1 is a view for explaining procedure-for making holographic stereogram.
Figure 2:
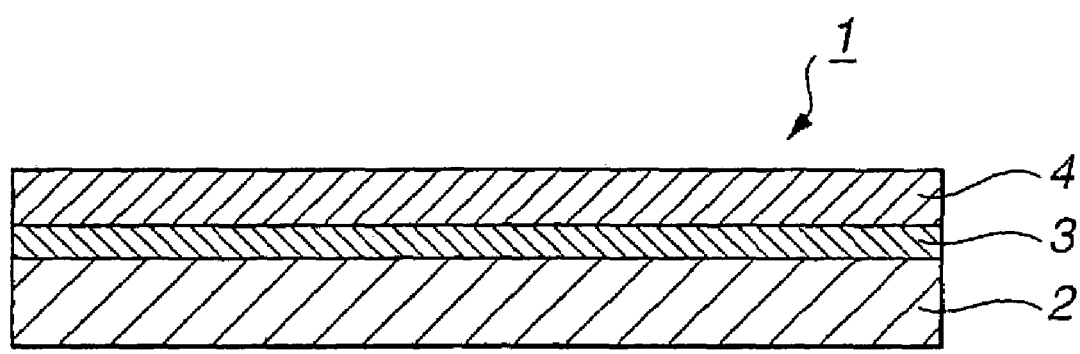
FIG. 2 is a view for explaining photosensitive process of photo-polymerization type photo-polymer.

Initially, explanation will be given with reference to FIG. 2 in connection with a more practical example of a recording medium for hologram. This recording medium 1 for hologram is adapted so that a hologram recording layer 3 comprised of photo-polymer layer is formed on a base 2 comprised of colorless and transparent resin film, etc. and a protective layer 4 comprised of colorless and transparent resin film, etc. is formed on the hologram recording layer 3. Thicknesses of the base 2 and the protective layer 4 and intermediate layer which will be described later are 5 μm to 100 μm, and thickness of the hologram recording layer 3 is 20 μm.

Figure 3A:
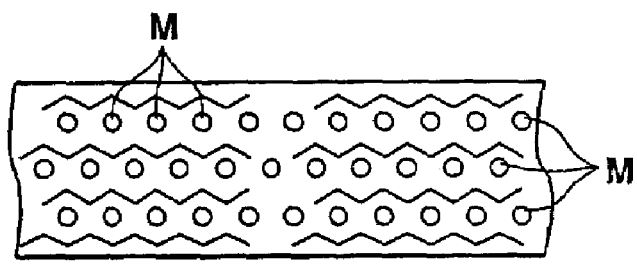
FIG. 3A is a view for explaining initial state in the photosensitive process of photo-polymerization type photo-polymer.
Figure 3B:
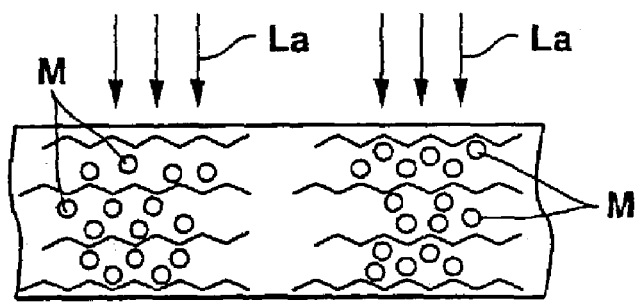
FIG. 3B is a view for explaining exposure state in the photosensitive process of photo-polymerization type photo-polymer.
Figure 3C:
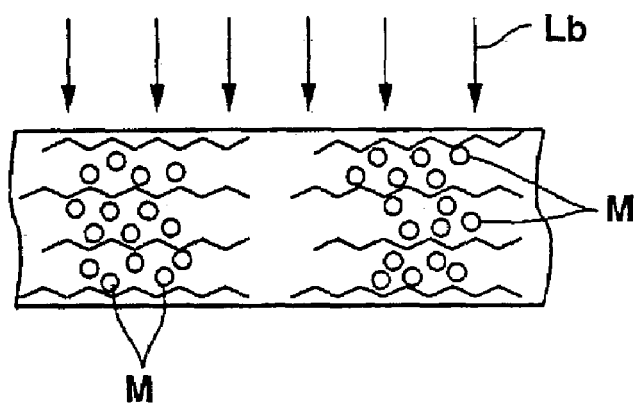
FIG. 3C is a view for explaining fixing state in the photosensitive process of photo-polymerization type photo-polymer.

It is preferable that there is used for the hologram recording layer 3 photo-polymer configured to be of film structure, which is suitable for recording interference patterns taking place by interference between reference light and object light as change of refractive index. In the photo-polymer configured to be of film structure, by irradiating light, refractive index of material is changed. In this embodiment, as the hologram recording layer 3, there is used, e.g., photopolymerization type photo-polymer such as "OMNI-DEX" (Trade Name) by DuPont Company, etc. In the photopolymerization type photo-polymer, in the initial state, as shown in FIG. 3A, monomers M are uniformly dispersed within matrix polymer. Oh the contrary, when light La of power of about 10 to 400 mJ/cm² is irradiated as shown in FIG. 3B, monomers M of the exposed portions are polymerized in dependency upon power of irradiated light La. As a result, densities of monomers locally change so that refractive index modulation takes place. Thereafter, by irradiating ultraviolet rays Lb of power of about 1000 mJ/cm² onto the entire surface as shown in FIG. 3C, polymerization of monomers M is completed. Thus, refractive index modulation degree is enhanced and the refractive index modulation is fixed.

Meanwhile, in recording three-dimensional picture onto hologram recording layer 3 comprised of the above-mentioned photo-polymerization type photo-polymer, as described later, reference light is transmitted through the base 2 so that it is incident on the hologram recording layer 3, and object light is transmitted through the protective layer 4 so that it is incident on the hologram recording layer 3. Thus, such interference patterns are recorded onto the hologram recording layer 3. Accordingly, the base 2 and the protective layer 4 are required to have optical characteristics such as less double refraction, less light scattering and high light transmission factor, etc. Particularly, since when rays of linearly polarized light of object light and reference light are transmitted through the base 2 and the protective layer 4, plane of polarization becomes oblique or they change into rays of elliptical polarized light different from each other in dependency upon double refraction of the base 2 and the protective layer 4, there is the possibility that contrast of interference pattern within the hologram recording layer 3 may be lowered.

How double refraction of the base 2 or double refraction of the protective layer 4 affects contrast of interference pattern formed at the hologram recording layer 3 will be described below in detail.

First, how polarization state changes in the case where laser beams having linearly polarized light are incident on the hologram recording layer through the base or the protective layer having double refraction will be explained.

Figure 4:
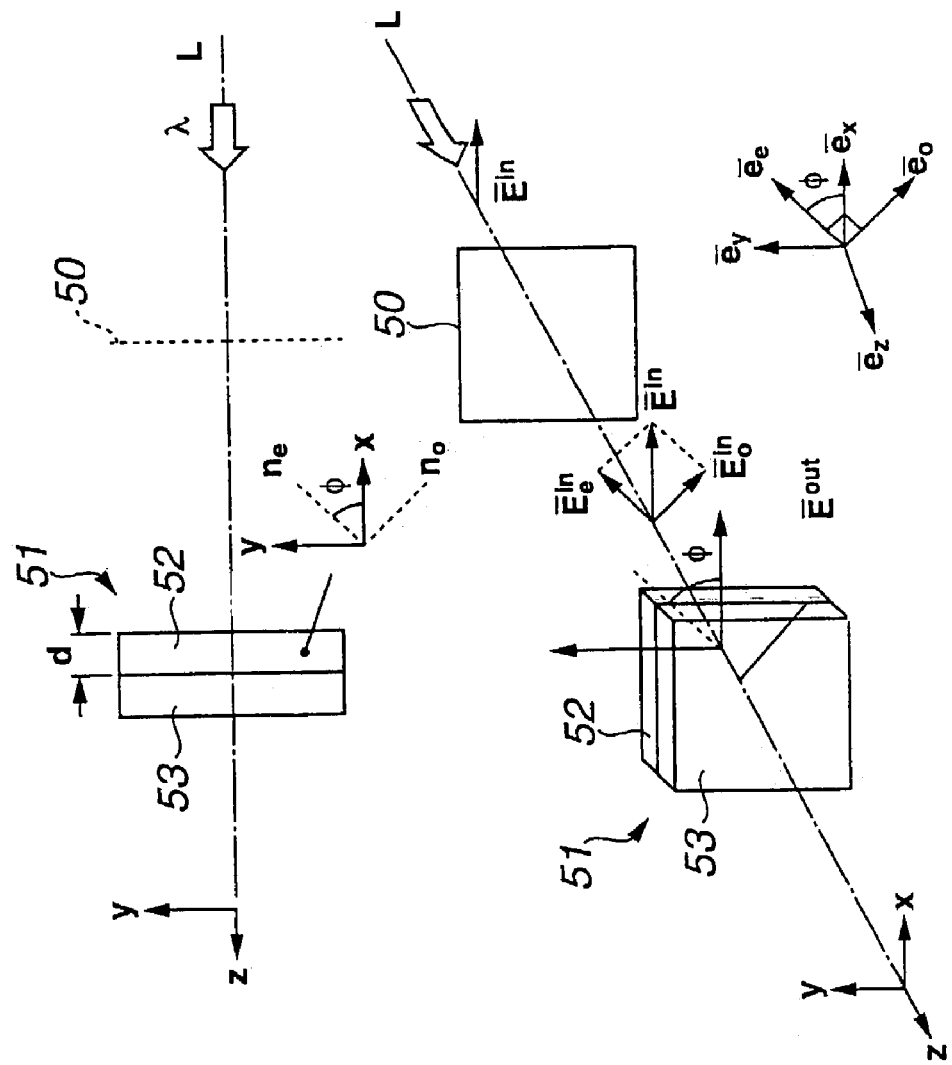
FIG. 4 is a view for explaining the state where one laser beam is incident on recording medium for hologram composed of base and hologramm recording layer through polarization plate.

The state where one laser beam L is incident, through a polarization plate 50, on a recording medium 51 for hologram composed of a hologram recording layer 53 provided at one side and a base 52 provided at the other side as shown in FIG. 4 is assumed as simple model.

Laser beam L is incident on the recording medium 51 for hologram through the polarization plate 50 and is transmitted through the base 52 having double refraction so that there takes place change in the polarization state. Thereafter, such laser beam is incident on the hologram recording layer 53. It is here to be noted that while laser beam L is assumed to be incident on the recording medium 51 for hologram through the polarization plate 50, such explanation is given for the purpose of facilitating that laser beam L is linearly polarized in the x-direction, and it is assumed that there is no absorption by the polarization plate 50.

Here, it is assumed that the wavelength of laser beams is $\lambda$, electric field vector of laser beams in the state linearly polarized in the x-direction is $\overline{E}^{in}$, and thickness of base-having double refraction is d. Here, for the brevity, the optical axis of the base having double refraction is assumed to be within the xy plane, refractive index in the axial direction is assumed to be $n_e$, refractive index in the direction perpendicular thereto is assumed to be $n_o$, and direction of the axis is assumed to form angle $\phi$ in the x-direction.

Further, unit vectors in x, y and z directions are respectively assumed to be $\overline{e}_x$, $\overline{e}_y$, $\overline{e}_z$, and unit vectors in the axis direction of double refraction and in the direction perpendicular thereto are respectively assumed to be $\overline{e}_e$, $\overline{e}_o$. At this time, with respect to these unit vectors, the relationship indicated by the following formula (1) holds.

$$\begin{cases} \overline{e}_e = \cos\phi \cdot \overline{e}_x + \sin\phi \cdot \overline{e}_y \\ \overline{e}_o = \sin\phi \cdot \overline{e}_x - \cos\phi \cdot \overline{e}_y \end{cases} \quad (1)$$

$$\begin{cases} \overline{e}_x = \cos\phi \cdot \overline{e}_e + \sin\phi \cdot \overline{e}_o \\ \overline{e}_y = \sin\phi \cdot \overline{e}_e - \cos\phi \cdot \overline{e}_o \end{cases}$$

In this model, the electric field-vector of the incident laser beams L is expressed as $E^{in} = E^{in} e_x$ by using complex amplitude $E^{in}$ and laser beams L in the state linearly polarized in the x-direction is assumed to be incident on the base 52 having double refraction. When electric field vector before laser beams are incident is separated into two components $\overline{E}_e^{in}$, $\overline{E}_o^{in}$—the direction of the axis of double refraction and in the direction perpendicular thereto, it is expressed as the following formula (2)

$$\overline{E} = \overline{E}_e^{in} + \overline{E}_o^{in} = E^{in}\overline{e}_x = E^{in}\cos\phi \cdot \overline{e}_e + E^{in}\sin\phi \cdot \overline{e}_o \quad (2)$$

$$\begin{cases} \overline{E}_e^{in} = E^{in}\cos^2\phi \cdot \overline{e}_x + E^{in}\cos\phi\sin\phi \cdot \overline{e}_y \\ \overline{E}_o^{in} = E^{in}\sin^2\phi \cdot \overline{e}_x - E^{in}\sin\phi\cos\phi \cdot \overline{e}_y \end{cases}$$

These electric field vectors of two components are passed through the base 52 having double refraction, thereby they respectively undergo phase changes of $2\pi i n_e d/\lambda$ and $2\pi i n_o d/\lambda$. Thus, electric field vector $\overline{E}^{out}$ out passed/emitted through the base 52 and incident on the hologram recording layer 53 is expressed as the following formulas (3), (4) in the state separated into two components $\overline{E}_e^{out}$, $\overline{E}_o^{out}$ in the direction of the axis and in the direction perpendicular thereto.

$$\overline{E}_e^{out} = \overline{E}_e^{in} \cdot \exp(2\pi i n_e d/\lambda) \quad (3)$$
$$= \overline{E}^{in}\cos^2\phi \cdot \exp(2\pi i n_e d/\lambda) \cdot \overline{e}_x + \overline{E}^{in}\cos\phi\sin\phi \cdot \exp(2\pi i n_e d/\lambda) \cdot \overline{e}_y$$

$$\overline{E}^{out} = \overline{E}_o^{in} \cdot \exp(2\pi i n_o d/\lambda) \quad (4)$$
$$= E^{in}\sin^2\phi \cdot \exp(2\pi i n_o d/\lambda) \cdot \overline{e}_x - E^{in}\sin\phi\cos\phi \cdot \exp(2\pi i n_o d/\lambda) \cdot \overline{e}_y$$

Thus, electric field vector $\bar{E}^{out}$ is expressed as the following formula (5).

$$\bar{E}^{out} = \bar{E}_e^{out} + \bar{E}_o^{out} \quad (5)$$
$$= E^{in}\{\cos^2\phi \cdot \exp(2\pi i n_e d/\lambda) + \sin^2\phi \cdot \exp(2\pi i n_o d/\lambda)\} \cdot$$
$$\bar{e}_x + E^{in}\cos\phi\sin\phi \cdot \{\exp(2\pi i n_e d/\lambda) - \exp(2\pi i n_o d/\lambda)\} \cdot \bar{e}_y$$

From this formula, it is seen that when $\phi=0$[rad], $\phi=\pi/2$ [rad] or $n_e=n_o$ does not hold by the effect of double refraction, the $e_y$ component takes place in electric field vector $\bar{E}^{out}$ incident on the hologram recording layer 53, thus the changes of polarization state taking place, which change is, for example, the rotation of plane of polarization with respect to incident light, etc.

It is to be noted that it has been explained for simplification that optical axis of base having double refraction is within the xy plane. However, similar explanation can be given to the case where the optical axis of the base having double refraction is not within the xy plane while replacing two refractive indexes $n_1$, $n_2$ which form long axis and short axis of ellipse indicating refractive index by $n_e$, no, in view of the relationship between propagation direction of rays (pointing vector) and refractive index vector plane, i.e., in view of the relationship indicated by ellipse prepared by plane perpendicular to wave vector and refractive index, elliptical body from an intuitive point of view.

Secondly, an explanation will be given-in connection with the case where, for recording of hologram, two laser light fluxes having linear polarization are passed through the base or the protective layer having double refraction so that they are incident on the hologram recording layer and-interfere with each other.

Figure 5:
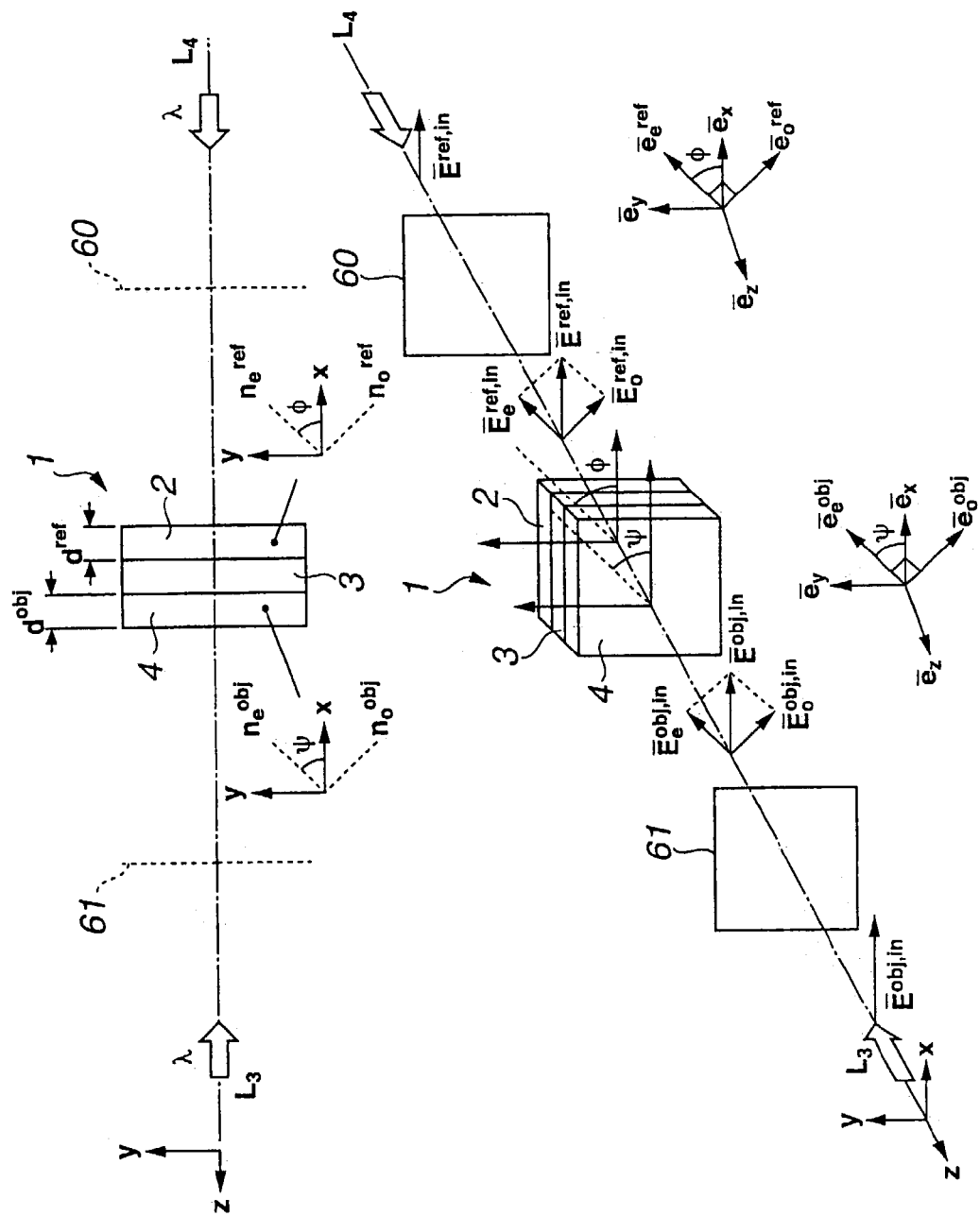
FIG. 5 is a view for explaining the state where reference light and object light are respectively incident on recording medium for hologram composed of base, hologram recording layer and protective layer through polarization plates.

There is assumed two light flux interference model that, as shown in FIG. 5, reference light L4 is transmitted through the base 2 and is incident on the hologram recording layer 3 with respect to the recording medium 1 for hologram composed of base 2, hologram recording layer 3 and protective layer 4, and object light L3 is transmitted through the protective layer 4 and is incident on the hologram recording layer 3, whereby interference patterns thereof are formed on the hologram recording layer 3.

Reference light L4 is incident on the recording medium 1 for hologram through a polarization plate 60, and is transmitted through the base 2 having double refraction so that there takes place change in the polarization state. Thereafter, this reference light L4 is incident on the hologram recording layer 3. On the other hand, object light L3 is also incident on the recording medium 1 for hologram through a polarization plate 61, and is transmitted through the protective layer 4 having double refraction so that there takes place change in the polarization state. Thereafter, this object light is incident on the hologram recording layer 3. It is to be noted that reference light L4 and object light L3, are assumed to be incident on the recording medium 1 for hologram through polarization plates 60, 61, such assumption is made in order to easily understand that laser beams are linearly polarized in the x-direction and it is assumed that there is no absorption by the polarization plate.

Here, wavelength of laser beams of reference light L4 and object light L3 is assumed to be $\lambda$. With respect to the reference light LA side, electric field vector of reference light in the state linearly polarized in the x-direction is assumed to be $E^{ref,in}$ and thickness of base 2 having double refraction is assumed to be $d^{ref}$. It is here to be noted for simplification that optical axis of base 2 having double refraction is assumed to be within the xy plane, refractive index in the axial direction is assumed to be $n_e^{ref}$, refractive index in the direction perpendicular thereto is assumed to be $n_o^{ref}$, and direction of the axis is assumed to form angle $\phi$ in the x-direction. With respect to the object light L3 side, electric field vector of object light L3 in the state linearly polarized in the x-direction is assumed to be $\bar{E}^{obj,in}$ and thickness of the protective layer 4 having double refraction is assumed to be $d^{obj}$. Here, for simplification, the optical axis of the protective layer 4 having double refraction is assumed to be within xy-plane, refractive index in the axial direction is assumed to be $n_e^{obj}$, refractive index in the-direction perpendicular thereto is assumed to be $n_o^{obj}$ and direction of the axis is assumed to form angle $\psi$ in the x-direction.

In this model, electric field vector of incident reference light L4 is assumed to be expressed as $\bar{E}^{ref,in}=E^{ref,in}\bar{e}_x$ by using complex amplitude $E^{ref,in}$, and reference light in the state linearly polarized in the x-direction is assumed to be incident on the base 2 having double refraction. In addition, electric field vector of incident object light L3 is assumed to be expressed as $\bar{E}^{obj,in}=E^{obj,in}\bar{e}_x$ by using complex amplitude $E^{obj,in}$ and object light L3 in the state linearly polarized in the x-direction is assumed to be incident on the protective layer 4 having double refraction.

From the result obtained by the model shown in FIG. 4, electric field vector $\bar{E}^{ref,out}$ of reference L4 passed/emitted through the base 2 and incident on the hologram recording layer 3 is represented by the following formula (6).

$$\bar{E}^{ref,out} = \bar{E}_e^{ref,out} + \bar{E}_o^{ref,out} \quad (6)$$
$$= E^{ref,in}\{\cos^2\phi \cdot \exp(2\pi i n_o^{ref} d^{ref}/\lambda) +$$
$$\sin^2\phi \cdot \exp(2\pi i n_o^{ref} d^{ref}/\lambda)\} \cdot \bar{e}_x +$$
$$E^{ref,in}\cos\phi\,\sin\phi \cdot \{\exp(2\pi i n_e^{ref} d^{ref}/\lambda) -$$
$$\exp(2\pi i n_o^{ref} d^{ref}/\lambda)\} \cdot \bar{e}_y$$

Moreover, the electric field vector $\bar{E}^{obj,out}$ of the object light L3 passed/emitted through the protective layer 4 and incident on the hologram recording layer 3 is represented by the following formula (7).

$$\bar{E}^{obj,out} = \bar{E}_e^{obj,out} + \bar{E}_o^{obj,out} \quad (7)$$
$$= E^{obj,in}\{\cos^2\varphi \cdot \exp(2\pi i n_e^{obj} d^{obj}/\lambda) +$$
$$\sin^2\varphi \cdot \exp(2\pi i n_o^{obj} d^{obj}/\lambda)\} \cdot \bar{e}_x +$$
$$E^{obj,in}\cos\varphi\,\sin\varphi \cdot \{\exp(2\pi i n_e^{obj} d^{obj}/\lambda) -$$
$$\exp(2\pi i n_o^{obj} d^{obj}/\lambda)\} \cdot \bar{e}_y$$

As a result, the light intensity I of interference patterns which can be formed on the hologram recording layer 3 is a square of absolute value of sum of the electric field vectors of the reference light L4 and the object light L3, and is represented by the following formula (8) when phase change values taking place as the result of the fact that rays of such light are passed through the base 2 and the protective layer 4 having double refraction are respectively indicated by $N_e^{ref}$, $N_o^{ref}$, $N_e^{obj}$, $N_o^{obj}$.

$$I = |\overline{E}^{ref,out} + \overline{E}^{obj,out}|^2 \quad (8)$$

$$= |[E^{ref,in}\{\cos^2\phi \cdot N_e^{ref} + \sin^2\phi \cdot N_o^{ref}\} + \overline{E}^{obj,in}\{\cos^2\varphi \cdot N_e^{obj} + \sin^2\varphi \cdot N_o^{obj}\}] \cdot \overline{e}_x +$$

$$[E^{ref,in}\cos\phi \cdot \sin\phi \cdot \{N_e^{ref} - N_o^{ref}\} + \overline{E}^{obj,in}\cos\varphi \sin\varphi \cdot \{N_e^{obj} - N_0^{obj}\}] \cdot \overline{e}_y|^2$$

$$= |E^{ref,in}\{\cos^2\phi \cdot N_e^{ref} + \sin^2\phi \cdot N_o^{ref}\} + \overline{E}^{obj,in}\{\cos^2\varphi \cdot N_e^{obj} + \sin^2\varphi N_o^{obj}\}|^2 +$$

$$|E^{ref,in}\cos\phi \sin\phi \cdot \{N_e^{ref} - N_0^{ref}\} + E^{obj,in}\cos\varphi \sin\varphi\{N_e^{obj} - N_o^{obj}\}|^2$$

Here, the phase changes $N_e^{ref}$, $N_o^{ref}$, $N_e^{obj}$, $N_o^{obj}$ are represented by the following formula (9).

$$N_e^{ref} = exp(2\pi i n_e^{ref} d^{ref}/\lambda), N_o^{ref} = exp(2\pi i n_o^{ref} d^{ref}/\lambda)$$
$$N_e^{obj} = exp(2\pi i n_e^{obj} d^{obj}/\lambda), N_o^{obj} = exp(2\pi i n_o^{obj} d^{obj}/\lambda) \quad (9)$$

From the formula of light intensity I of this interference pattern, in the case where a certain reference light L4 and a certain object light L3 which are respectively perpendicularly incident on the recording medium 1 for hologram are given, in order to maximize contrast of light intensity of interference pattern, polarization states of reference light L4 and object light L3 are configured to be the same, i.e., relationship therebetween is configured to be represented by the following formula (10).

$$|E^{ref,in}\cos\phi\sin\phi \cdot \{N_e^{ref} - N_o^{ref}\}| = |E^{obj,in}\cos\phi\sin\phi \cdot \{N_e^{obj} - N_o^{obj}\}| \quad (10)$$

Here, for simplification, even in the case where light intensities of reference light L4 and object light L3 are equal to each other (i.e., absolute values of complex amplitudes of the reference light and the object light are equal to each other), namely, $|E^{ref,in}| = |E^{obj,in}|$1, it is necessary to satisfy the following formula (11).

$$\cos\phi\sin\phi \cdot |exp(2\pi i n_o^{ref} d^{ref}/\lambda) - exp(2\pi i n_o^{ref} d^{ref}/\lambda)|$$
$$= \cos\phi\sin\phi \cdot |exp(2\pi i n_o^{obj} d^{obj}/\lambda) - exp(2\pi i n_o^{obj} d^{obj}/\lambda)| \quad (11)$$

As the result of the above, in order to satisfy this formula (11), such an approach is employed that, with respect to material of the base 2, thickness is configured to be $d^{ref}$, refractive index in the axial direction of double refraction of the base is configured to be $n_e^{ref}$, refractive index in the direction perpendicular thereto is configured to be $n_o^{ref}$ and direction of the axis is configured to form angle $\phi$ in the x-direction, and, with respect to material of the protective layer 4, thickness is configured to be $d^{obj}$, refractive index in the axial direction of double refraction of the protective layer 4 is configured to be $n_e^{obj}$, refractive index in the direction perpendicular thereto is configured to be $n_o^{obj}$, and axial direction is configured to form angle $\psi$ in the x-direction. Thus, recording of hologram of good contrast of interference pattern which can be formed at the hologram recording layer 3, i.e., high diffraction efficiency can be made.

As the solution of the above-mentioned formula (11), plural solutions are given by the above-mentioned eight values, i.e., $d^{ref}$, $n_e^{ref}$, $n_o^{ref}$, $\phi$, $d^{obj}$, $n_e^{obj}$, $n_o^{obj}$, $\psi$. Particularly, when (a) in the base, $n_e^{ref} = n_o^{ref}$, $\phi=0[rad]$ or $\phi=\pi/2[rad]$ is configured to hold, (b) in the protective layer, $n_e^{obj} = n_o^{obj}$, $\psi=0[rad]$ or $\psi=\pi/2[rad]$ is configured to hold, satisfying of (a) and (b) at the same time constitutes one of solutions.

To put it in physical expression, satisfying of both phrases of (a), in the base, "there is no double refraction in the base" with respect to incident direction of reference light, "direction of linear polarization of reference light is the same as axial direction of double refraction of base" or "direction of linear polarization of reference light is the same as direction perpendicular to the axis of double refraction of the base", and (b), in the protective layer, "there is no double refraction in the protective layer" with respect to incident direction of object light, "direction of linear polarization of object light is the same as axial direction of double refraction of the protective layer", or "direction of linear polarization of object light is the same as direction perpendicular to the axis of double refraction of the protective layer" constitutes one of solutions.

The relationship between these (a) and (b) results in the relationship between irradiation states of reference light and object light and the recording medium for hologram, and relates to a making method or a recording apparatus for holographic stereogram or hologram.

On the contrary, geometrical shape of the recording medium for hologram and axial direction of double refraction of the base and the protective layer constituting the recording medium for hologram are configured to have relationship similar to (a) and (b), thereby making it possible to unify, every apparatuses, polarization states of recording apparatuses for holographic stereogram or hologram.

Namely, with respect to geometrical shape of the strip-shaped or the like recording medium for hologram having the longer side and the shorter side, axial direction of double refraction of optical material constituting the recording medium for hologram is configured to be coincided with the longer side or the shorter side, or the direction perpendicular to the axis of double refraction is configured to be coincided with the longer side or the shorter side.

Figure 6:
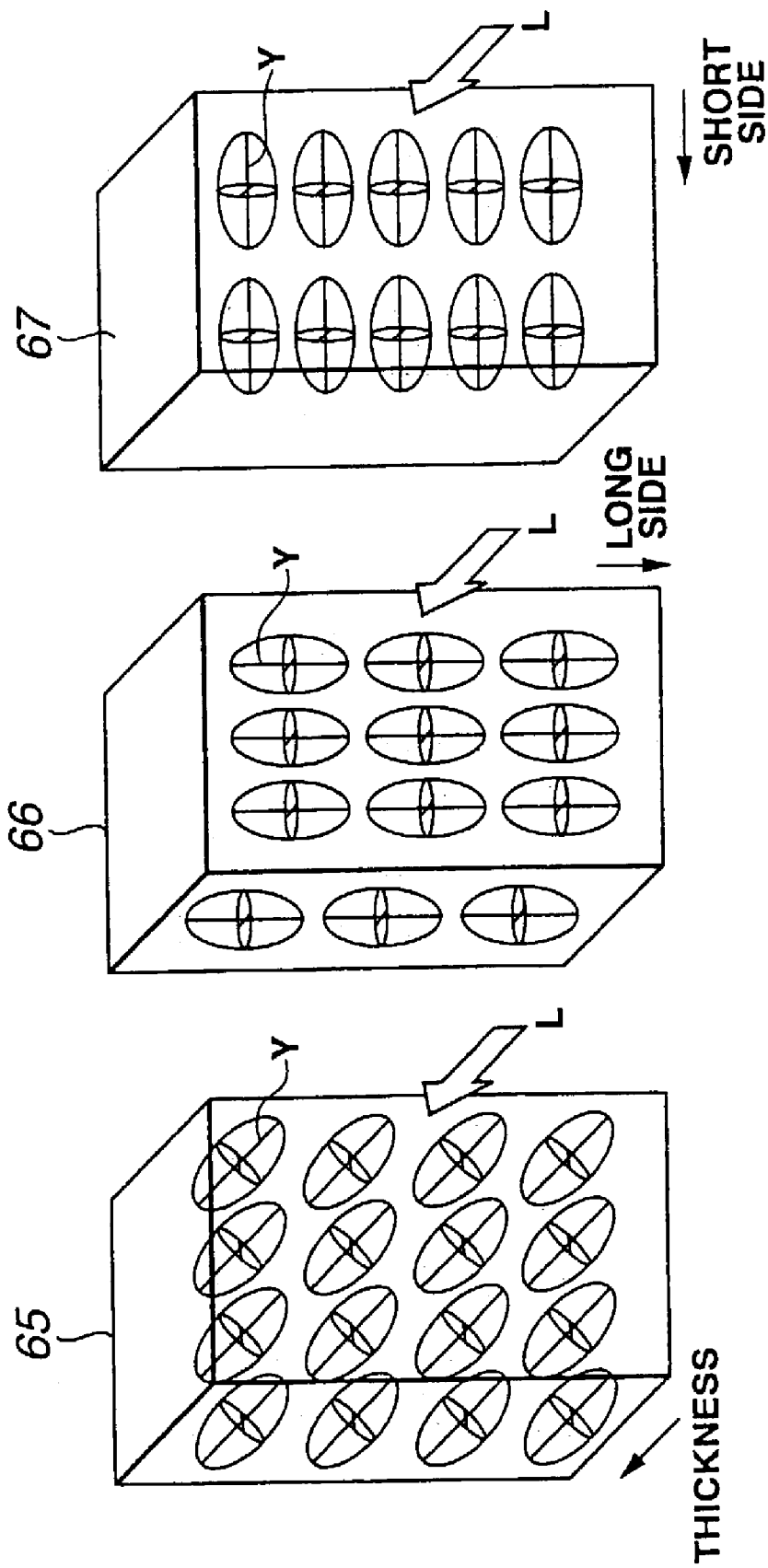
FIG. 6A is a view for explaining optical state of materials of base and protective layer constituting recording medium for hologram by using refractive index elliptical body, wherein axial direction of double refraction is configured to be coincided with thickness direction of the recording medium for hologram.
FIG. 6B is a view for explaining optical state of materials of base and protective layer constituting recording medium for hologram by using refractive index elliptical body, wherein axial direction of double refraction is configured to be coincided with a direction of the longer side of the recording medium for hologram.
FIG. 6C is a view for explaining optical state of materials of base and protective layer constituting recording medium for hologram by using refractive index elliptical body, wherein axial direction of double refraction is configured to be coincided with a direction of the shorter side of the recording medium for hologram.

When optical state of material of base 2 and protective layer 4 constituting such a recording medium 1 for hologram is illustrated by using refractive index elliptical body, there results optical state as shown in FIG. 6. This FIG. 6 shows the example where uniaxial optical material is used.

In FIG. 6A, axial direction Y of double refraction of uniaxial optical material is configured to be coincided with thickness direction of a strip-shaped recording medium 65 for hologram. By doing so, there results the state where there is no double refraction with respect to laser beams L incident in a manner perpendicular to recording medium 65 for hologram.

In FIG. 6B, axial direction Y of double refraction of uniaxial optical material is configured to be coincided with a direction of the longer side of strip-shaped recording medium 66 for hologram. Thereby, it is easy that there results the state where direction of linear polarization is configured to be the same as axial direction of double refraction or the state perpendicular thereto with respect to laser beams L incident on recording medium 66 for hologram.

In FIG. 6C, the axial direction Y of double refraction of uniaxial optical material is configured to be coincided with a direction of the shorter side of strip-shaped recording medium 67 for hologram. Thereby, it is easy that there results the state where direction of linear polarization is configured to be the same as axial direction of double refraction or the state perpendicular thereto with respect to laser beams L incident on recording medium 67 for hologram.

By the above-described invention, it is possible to univocally determine polarization state of the hologram recording apparatus in a manner coincided with geometrical shape of the strip-shaped recording medium for hologram as in the above-mentioned example shown. On the contrary, such an approach is employed to unify and standardize polarization states of hologram recording apparatuses every apparatuses, thereby making it possible to unify and standardize geometrical shape of the recording medium for hologram. Thus, in both the hologram recording apparatus and the recording medium for hologram, mass production can be made and reduction in cost can be realized.

Namely, as the base 2 and the protective layer 4, there is used material in which axial direction of double refraction is configured to be coincided with geometrical shape of the recording medium for hologram, and is desirably used material of less double refraction, and interference patterns of three-dimensional image are recorded onto the hologram recording layer 3. Thus, recording of interference patterns of good contrast can be carried out. Furthermore, by irradiating reproduction light onto those interference patterns, reproduction of high diffraction efficiency can be made, and reproduction image is of high quality. From this fact, it can be said that there holds a predetermined relationship with respect to quality of reproduction image, diffraction efficiency and quantity and state of double refraction.

Let suppose the case where polymer material (resin material) is used in the state of film (thin film structure) as optical materials used for the protective layer and the base.

Even in the case where raw material having less double refraction is used as optical material, there are instances where double refraction takes place at the time of molding. Particularly, in the case where material is configured to be of film structure for the purpose of using it as the base, the protective layer or the intermediate layer of the recording medium for hologram, since expansion process is added for the purpose of molding, double refraction is easy to take place. This is because shape of refractive index elliptical body mainly depends upon polarization state of molecular ring in polymer material. Namely, optical axis of double refraction greatly depends upon polarization factor and bonding direction of molecule.

Thus, in the case of allowing polymer material to be of film structure, although depending upon components of raw material used, quantity of double refraction becomes greatly different depending upon its manufacturing method. In particular, in expanding process, which is typical manufacturing method for film, there are many instances where molecular ring is expanded in expanding direction and double refraction which was less in the row material is also increased depending upon expanding state.

Thus, the recording medium for hologram is used in the state where axial direction of double refraction is configured to be coincided with geometrical shape thereof as in this embodiment, thereby making it possible to use such inexpensive material typically manufactured as optical film.

In addition to the above, it is more desirable to use material having less double refraction as raw material. As material having less double refraction, there can be used, e.g., material obtained by allowing transparent resin (optical plastic, optical polymer) developed as base material for optical disc to be of film structure. In the structure of the above-described and already announced recording medium for hologram, polyethylene terephthalate (PET), and vinyl chloride (PVC) are used, but such materials are not suitable from viewpoints of double refraction and transparency. As the material, material called non-double refractive optical polymer is desirable.

When desirable materials are exemplified, there is polycarbonate resin (PC). As material having double refraction lesser than that, there is methacrylic resin (acryl, PMMA). As material having double refraction lesser than methacrylic resin, there are "ZEONEX" (Trade Name, Nippon Zeon Co., Ltd.), "ARTON" (Trade Name, JSR Kabushiki Kaisha), "APEL" (Trade Name, Mitsui Kagaku Kabushiki Kaisha) and "Olefin Maleimide Copolymer" (Tosoh Kabushiki Kaisha) which are classified into alicyclic olefin (amorphous polyolefin). As other material having less double refraction, there is "Optolez" (Trade Name, Product Names OZ-1000, OZ-1100, OZ-1310, OZ-1330, etc., Hitachi Kasei Kogyo Kabushiki Kaisha) which is classified into alicydlic acryl.

In addition to the above, it is further desirable to use material such that double refraction is difficult to take place with respect to expansion. As one method thereof, there is used material manufactured by method of random-copolymerizing monomer indicating inverse (plus or minus) double refraction characteristic with the above-mentioned polymer. In particular, it is desirable to use, as the base, the protective layer and the intermediate layer of the recording medium for hologram, film by material in which stilbene is 3% doped by weight in PMMA as indicated in "Iwata et al. Proceedings of Polymer Society, V61.45, No. 3 page 461 (1996)".

Three-dimensional picture is recorded, as holographic stereogram, onto the recording medium 1 for hologram in which hologram recording layer 3 is configured to be put between the above-described base 2, protective layer 4 and/or intermediate layer which will be described later, which consist of materials as described above.

Subsequently, holographic stereogram preparing apparatus for recording three-dimensional picture onto the above-described recording medium 1 for hologram as holographic stereogram will be described. While explanation will be given here in connection with the apparatus for recording strip-shaped plural element holograms onto one recording medium 1 for hologram to thereby prepare holographic stereogram configured to have parallax information in the lateral direction and-in the longitudinal direction, there may be also mentioned, e.g., an apparatus for recording dot-shaped element hologram onto one recording medium 1 for-hologram to thereby prepare L holographic stereogram configured to have parallax information in the lateral direction and in the longitudinal direction.

This holographic stereogram preparing apparatus is directed to a making apparatus for the so-called one step holographic stereogram, and is adapted to output, as holographic stereogram, recording medium 1 itself where interference pattern between object light and reference light are recorded.

Figure 7:
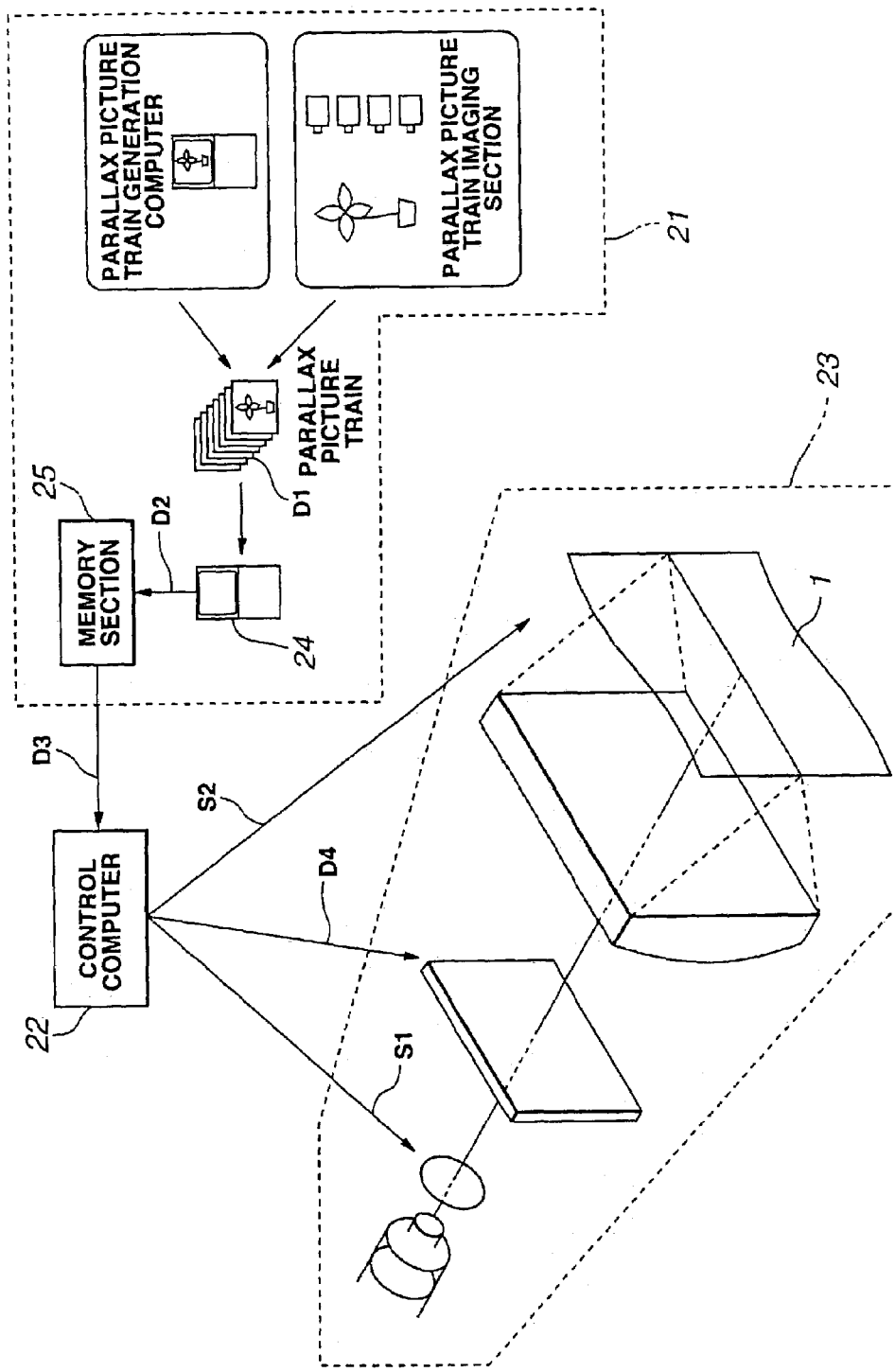
FIG. 7 is a view showing the configuration of a holographic stereogram preparing apparatus.

As shown in FIG. 7, this holographic stereogram preparing apparatus (unit) is composed of a data processing unit 21 for carrying out processing of picture data to be recorded, a computer 22 for control which carries out control of the-entirety of this system, and an exposure processing unit 23 including an optical system for making holographic stereogram.

The data processing unit 21 reads thereinto parallax picture train D1 from parallax picture train imaging section or parallax picture train generation computer, etc. to implement predetermined picture processing for holographic stereogram, e.g., view point conversion processing and/or keystone distortion correction processing, etc. to the parallax picture train D1 by a picture processing computer 24 to store (record) picture data D2 to which-predetermined processing has been implemented into a memory section 25 such as memory or hard disc, etc.

In this example, the parallax picture train imaging section delivers, to the picture processing computer 24, as parallax picture train D1, e.g., picture image obtained by photographing object from different plural view points in lateral direction by simultaneous photographing by multi-eye type camera or successive photographing by movement type camera, etc.

Furthermore, the parallax picture train generation computer prepares parallax picture train D1 consisting of plural picture images including parallax information by making use of the technique such as CAD or CG, etc. to deliver this parallax picture train D1 to the picture processing computer 24.

Furthermore, the data processing unit 21 reads out, in order, picture data every one picture from the memory section 25 when preparing holographic stereogram to send out this picture data D3 to the control computer 22.

The control computer 22 controls the exposure processing unit 23 to record, in succession, as strip-shaped element holograms, picture images based on picture data D3 delivered from the data processing unit 21 onto the recording medium 1 for hologram set within the exposure processing unit 23.

At this time, the control computer 22 carries out control of shutter, display section and printer head portion, etc provided at the exposure processing unit 23 as described later. Namely, the control computer 22 sends out a control signal S1 to the shutter to control opening/closing operations of the shutter, delivers picture data D4 to the display section to allow the display section to display picture image based on the picture data D4, and sends out a control signal S2 to the printer head portion to control sending operation, etc. of the recording medium 1 for hologram by the printer head portion.

Subsequently, the exposure processing unit 23 will be described in detail with reference to the attached drawings. Here, FIG. 8A is a view in which the optical system of the entirety of the exposure processing unit 23 is viewed from the upper direction and FIG. 8B is a view in which the portion for object, light of the optical system of the exposure processing unit 23 is viewed from lateral direction. It is to be noted that the optical system is not required to have configuration as shown in FIG. 8A and FIG. 8B, but if there is employed such a configuration capable of preparing holographic stereogram, e.g., incident direction of reference light, the number of lenses, the kind thereof and combination thereof may be suitably changed.

As shown in FIG. 8A, the exposure processing unit 23 comprises a laser light source 31 for emitting laser beams of a predetermined wavelength, and a shutter 32 for exposure and a half mirror 33 disposed on the optical axis of laser beams L1 from the laser light source 31.

The exposure shutter 32 is closed when the recording medium 1 for hologram is not exposed and is opened when the recording medium 1 for hologram is exposed. In addition, the half mirror 33 serves to separate laser beams L2 passed through the exposure shutter 32 into reference light and object light. Light L4 reflected by the half mirror 33 serves as reference light and light L3 transmitted through the half mirror 33 serves as object light.

On the optical axis of light L4 reflected by the half mirror 33, as the optical system for reference light, there are arranged a cylindrical lens 40, a collimator lens 41 for changing reference light into parallel light, a total reflection mirror 42 for reflecting light configured to be parallel light by the collimator lens 41 in order recited.

The light reflected by the half mirror 33 is then first configured to be divergent light by the cylindrical lens 40 and is then configured to be parallel light by the collimator lens 41. Thereafter, such parallel light is reflected by the total reflection mirror 42 and is incident on the recording medium 1 for hologram.

On the other hand, on the optical axis of light L3 transmitted through the half mirror 33, as shown in FIGS. 8A and 8B, as the optical system for object light, there are disposed a total reflection mirror 34 for reflecting transmitted light from the half mirror 33, a spatial filter 35 in which convex lens and pin hole are combined, a collimator lens 36 for allowing object light to be in parallel, a display section 37 for displaying picture image to be recorded, and a cylindrical lens 38 for converging object light onto the recording medium 1 for hologram in order recited.

Thus, light L3 transmitted through the half mirror 33 is reflected by the total reflection mirror 34, and is then allowed to be diffused light from spot light source by the special filter 35. Then, such diffused light is configured to be parallel light by the collimator lens 36 and is then incident on the display section 37. In this example, the display section 37 is e.g., a picture display section of the transmission type comprised of liquid crystal panel, and serves to display picture image based on picture data. D4 sent from the control computer 22. Furthermore, light transmitted through the display section 37 is modulated in accordance with picture image displayed on the display section 37, and is then incident on the cylindrical lens 39.

In addition, light transmitted through the display section 37 is converged in lateral direction by the cylindrical lens 39, and this convergent light is incident on the recording medium 1 for hologram as object light. Namely, in this exposure processing unit 23, projected light from the display section 37 is incident upon the recording medium 1 for hologram as strip-shaped rays of object light.

In this case, with respect to reference light and object light, reference light is configured to be incident on one principal surface of the recording medium 1 for hologram and object light is configured to be incident on the other principal surface of the recording medium 1 for hologram. Namely, reference light is configured to be incident at a predetermined incident angle on one principal surface of the recording medium 1 for hologram, and object light is configured to be incident on the other principal surface of the recording medium 1 for hologram in such a manner that the optical axis is substantially perpendicular to the recording medium 1 for hologram. Thus, the reference light and the object light interfere with each other on the recording medium 1 for hologram. As a result, interference patterns taking place by such interference are recorded onto the recording medium 1 for hologram as changes of refractive index.

Moreover, this exposure processing unit 23 comprises printer-head portion 43 which can intermittently feed the recording medium 1 for hologram under control of the control computer 22. This exposure processing unit 23 carries out intermittent feed of the recording medium 1 for hologram by one element hologram on the basis of control signal from the control computer 22 every time one picture image is recorded as one element hologram with respect to the recording medium 1 for hologram which has been set in a predetermined state at the printer head portion 43. Thus, picture images based on picture data processed at the data processing unit 21 are recorded in succession onto the recording medium 1 for hologram as element hologram in a manner such that they are successive in the lateral direction.

This exposure processing unit 23 displays, on the display section 37, picture image for exposure based on picture data. Furthermore, the shutter 32 for exposure is opened by a predetermined time so that the recording medium 1 for hologram is exposed.

At this time, light L4 which has been reflected by half mirror 33 of laser beams L2 emitted from laser light source 31 and transmitted through the shutter 32 for exposure is incident on the recording medium 1 for hologram as reference light. In addition, light L3 which has been transmitted through the half mirror 33 results in projected light in which picture image displayed on the display section 37 is projected, and such projected light is incident on the recording medium 1 for hologram as object light. Thus, picture image for exposure displayed on the display section 37 is recorded as strip-shaped element picture onto the recording medium 1 for hologram.

Furthermore, when recording of one picture image onto the recording medium 1 for hologram is completed, the recording medium 1 for hologram is then fed by one element hologram by the printer head portion 43.

The above-mentioned operations are repeated in the state where picture images for exposure configured to be displayed on the display section 37 are changed in succession in order of parallax picture train. Thus, picture images for exposure based on the original picture data are recorded in succession as strip-shaped element picture onto the recording medium 1 for hologram.

Figure 9:
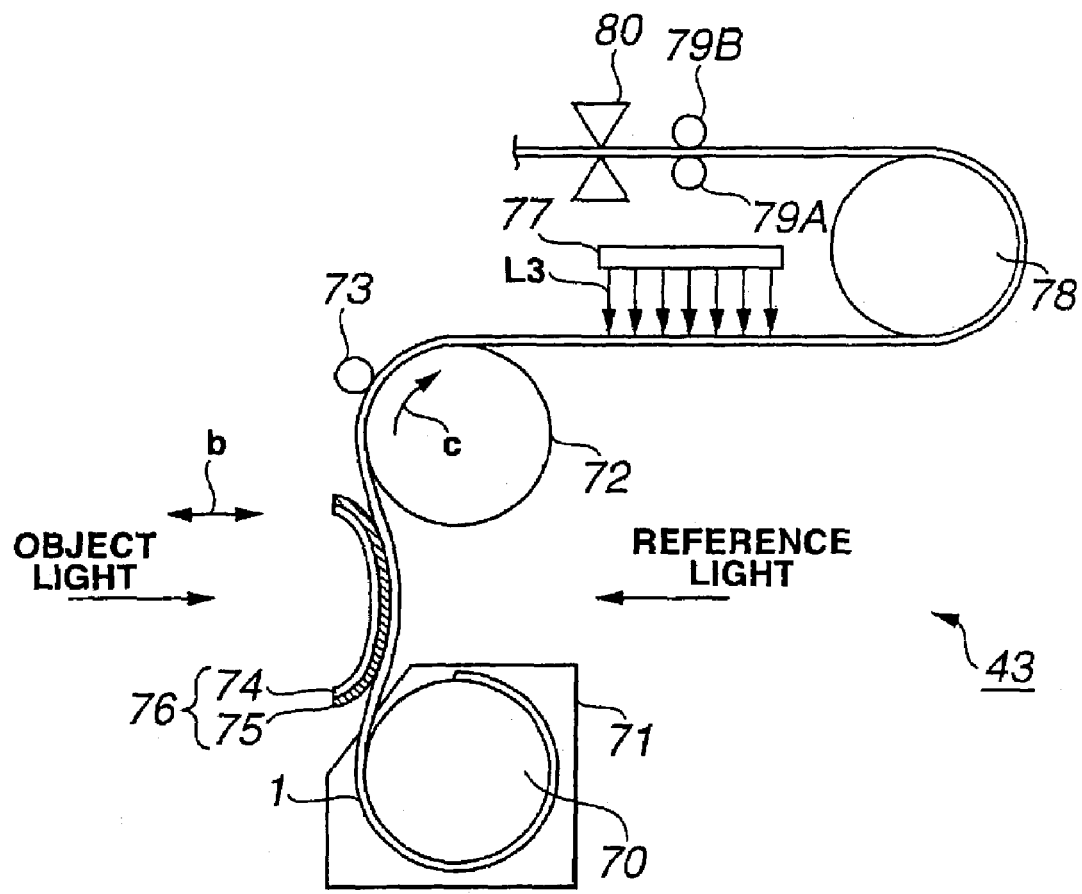
FIG. 9 is a view for explaining detailed configuration of printer head portion in the above-mentioned holographic stereogram preparing apparatus.

The printer head portion 43 will be described in detail with reference to FIG. 9. This printer head portion 43 is adapted so that there are disposed in succession a film cartridge 71, rollers 70, 72 for intermittent feeding, an optical part 76, a pinch roller 73, an ultraviolet lamp 77, a heat roller 78, a pair of feed rollers 79A, 79B for feed ejection, and a cutter 80.

This printer head portion 43 is adapted to rotatably axially support, with a predetermined torque, intermittent feeding roller, 70 within the film cartridge 71 loaded at a predetermined position, and can hold the recording medium 1 for hologram drawn out from the film cartridge 71 in such a manner that it is put between the intermittent feeding rollers 70, 72 and the pinch roller 73. Thus, the recording medium 1 for hologram is held in a manner substantially perpendicular to the object light between the intermittent feeding roller 70 and the intermittent feeding roller 72.

The intermittent feeding roller 70 and the intermittent feeding roller 72 are biased in directions away from each other by torsion coil spring (not shown). Thus, a predetermined tension is applied to the recording medium 1 for hologram disposed in such a manner to bridge across the intermittent feeding roller 70 and the intermittent feeding roller 72. As a result, position of the recording medium 1 for hologram is stabilized and vibration is suppressed. It is to be noted that such a tension may be applied by the pinch roller system or sprocket feed system, etc.

The optical part 76 is adapted so that one-dimensional diffusion plate 74 and a louver film 75 are integrally stuck in the state where they are curved, and is disposed coincided with incident position of object light between the intermittent feeding roller 70 and the intermittent feeding roller 72. This optical part is movably held in a direction close to the recording film 1 for hologram or away therefrom as indicated by arrow b by optical part drive mechanism (not shown).

In this example, the one-dimensional diffusion plate 74 serves to allow holographic stereogram to have angle of visibility in the longitudinal direction. Namely, by this one-dimensional diffusion plate 74, object light is diffused in the longitudinal direction, i.e., in the long axis direction of element hologram to be made or prepared. Thus, holographic stereogram to be made or prepared has angle of visibility in the longitudinal direction.

In addition, the louver film 75 is an optical part having fine reed screen-shaped lattice, and serves to prevent that reference light transmitted through the recording medium 1 for hologram is reflected by the one-dimensional diffusion plate 74 and is incident on the recording medium 1 for hologram for a second time.

The printer head portion 43 is driven on the basis of control signal delivered from the control computer 22 before exposure operation is started to move the optical part 76 in a direction close to the recording medium 1 for hologram. Thus, the optical part 76 is pressed onto the recording medium 1 for hologram loaded between the intermittent feeding roller 70 and the intermittent feeding roller 72. By pressing the optical part 76 onto the recording medium 1 for hologram in this way, it is possible to suppress very small vibration of the recording medium 1 for hologram. By suppressing very small vibration of the recording medium 1 for hologram as stated above, it becomes possible to make (prepare) holographic stereogram excellent in the diffraction efficiency and in which bright reproduction image can be obtained.

The intermittent feeding rollers 70, 72 are adapted so that they can be desirably rotated in the direction as indicated by arrow c by stepping motor (not shown). This stepping motor rotates intermittent feeding rollers 70, 72 every completion of exposure corresponding to one picture image on the basis of control signal S2 delivered from the control computer 22 so that the recording medium 1 for hologram is sent by one element hologram every completion of exposure corresponding to one picture image.

The ultraviolet lamp 77 serves to irradiate ultraviolet rays Lb to the recording medium 1 for hologram sent by the intermittent feeding roller 72. As the result of the fact that ultraviolet rays are irradiated onto the recording medium 1 for hologram by this ultraviolet lamp 77, polymerization of monomer M of the hologram recording layer 3 of the recording medium 1 for hologram is completed.

The heat roller 78 is provided with heating means such as heater, etc. therewithin, and is adapted so that the peripheral surface of the heat roller 78 can maintain temperature of about 120° C. Furthermore, this heat roller heats the recording medium 1 for hologram to thereby increase refractive index modulation degree of the hologram recording layer 3 to fix recording picture image of the hologram recording layer 3.

Ejecting feeding rollers 79A, 79B at the succeeding stage of the heat roller 78 are rotated in a manner synchronous with intermittent feeding roller 72 by drive mechanism (not shown) supplied with control signal from the control computer 22. Thus, the protective layer 4 can be securely held in the state tightly in contact with the peripheral side surface of the heat roller 78 without allowing the recording medium 1 for hologram to be loosened between the intermittent feeding roller 72 and the ejecting feeding rollers 79A, 79B.

Moreover, drive mechanism (not shown) for the cutter 80 drives the cutter 80 at the stage where all area portions in which picture image of the recording medium 1 for hologram 1 is recorded are ejected toward the external with respect to the cutter 80 after respective picture images based on respective picture data of parallax picture train are recorded onto the recording medium 1 for hologram on the basis of control signal delivered from the control computer 22 to thereby separate such portions from other portions. Thus, portions where respective picture data of parallax picture train are recorded of the recording medium 1 for hologram can be ejected toward the external as one holographic stereogram.

In recording three-dimensional picture image onto the recording medium 1 for hologram by the printer head portion 43 as described above, control signal is first sent out from the control computer 22 to the optical part drive mechanism of the printer head portion 43 in the state where the recording medium 1 for hologram is loaded across the intermittent feeding roller 70 and the intermittent feeding roller 72 to drive the optical part drive mechanism to press the optical part 76 onto the recording medium 1 for hologram at a predetermined pressure.

Then, picture data D4 is sent out from the control computer 22 to the display section 37 of the exposure processing unit 23 to allow the display section 37 to display picture image for exposure based on this picture data D4, and to send out control signal S1 from the control computer 22 to the shutter 32 to open the shutter 32 by a predetermined time to expose the recording medium 1 for hologram.

At this time, light L4 which has been reflected by half mirror 33 of laser beams emitted from the laser light source 31 and transmitted through the shutter 32 is incident on the recording medium 1 for hologram as reference light. Furthermore, light L3 which has been transmitted through the half mirror 33 results in projected light in which picture image displayed on the display section 37 is projected, and this projected light is incident on the recording medium 1 for hologram as object light. In this way, picture image for exposure configured to be displayed on the display section 37 is recorded onto the recording medium 1 for hologram as rectangular element hologram.

Furthermore, after recording of one picture image onto the recording medium for hologram is completed, control signal S2 is then sent out from the control computer 22 to the printer head portion 43 to feed the recording medium 1 for hologram by one element hologram.

The above-mentioned operations are repeated in the state where picture images for exposure configured to be displayed on the display section 37 are changed in succession in order of parallax picture train. Thus, picture images for exposure based on picture data processed by the data processing unit 21 are recorded in succession onto the recording medium 1 for hologram as rectangular element hologram.

As described above, in this holographic stereogram preparing apparatus, plural picture images for exposure based on output of the data processing unit 21 are displayed in succession on the display section 37 and shutter 32 is opened every respective picture images. Thus, respective picture images are respectively recorded in succession onto the recording medium 1 for hologram as rectangular element holograms. At this time, since the recording medium 1 for hologram is fed by one element hologram every one picture image, respective element holograms are recorded onto the recording medium 1 for hologram as plural element holograms successive in lateral direction. Thus, holographic stereogram having parallax in the lateral direction can be obtained.

Thereafter, ultraviolet rays are irradiated over the entire surface of the recording medium 1 for hologram thus exposed by ultraviolet lamp 77 at the printer head portion 43. Thus, polymerization of monomer M at the hologram recording layer 3 of the recording medium 1 for hologram is completed. Furthermore, at the succeeding stage of this ultraviolet lamp 77, the recording medium 1 for hologram is heated by heat roller 78. As a result, refractive index modulation degree of the hologram recording layer 3 is increased, thereby the recording picture image being fixed.

Here, there will be added explanation relating to refractive indexes of base and protective layer of the recording medium for hologram in the case where the optical system shown in FIG. 8, i.e., the optical system for allowing reference light to be obliquely incident, which is so called off-axis hologram optical system is used.

In the above-described second model, there has been given, for simplification of the model, explanation with respect to the optical system where reference light is incident in a manner perpendicular to the recording medium for hologram, which is so called on-axis hologram optical system.

Due to-the difference between the off-axis hologram optical system and the on-axis hologram optical system, consideration must be taken in connection with (1) "refraction of rays of light by difference of refractive index when reference light is incident from air to base, and change of direction of rays of light based thereon", (2) "Change of transmission distance by thickness of the base based on the fact that rays of light are perpendicularly transmitted within the base into transmission distance of actual rays of light based on the fact that rays of light are obliquely transmitted within the base", (3) "Refractive index vector within the base changes in dependency upon direction where rays of light are incident on the base by the geometrical relationship between axis of double refraction of base and direction in which rays of light are incident on the base", and the like.

However, also in all of the above-mentioned (1), (2), (3), by replacing physical quantity such as propagation direction of rays of light by difference of optical system, etc. or limiting material property of optical material, the previously described model can be applied.

With respect to the item (1), direction of rays of light after they are incident is first determined by the Snell laws (rule of reflection/refraction) from the state of double refraction when reference light is incident on the base. Furthermore, since the, direction of rays of light is direction of rays of light transmitted through the base, the state of double refraction with respect to that direction is replaced by the state of double refraction in the previously described model so that the previously described model can be applied.

With respect to the item (2), since phase change based on the fact that rays of light are passed through the base is determined in accordance with transmission distance of actual rays of light based on the-fact that rays of light are obliquely transmitted through the base, it is sufficient to replace thickness $d^{ref}$ of the base by actual transmission distance of rays of light.

With respect to the item (3), as the optical state of the example where uniaxial optical material is used is illustrated by using refractive index elliptical body in the above-mentioned drawing, refractive index vector of base changes in dependency upon whether rays of light are perpendicularly incident or are obliquely incident. By using the explanation of the item (1) while paying attention to the relationship between incident angle and refractive index vector to replace the state of double refraction with respect to direction of rays of light by the state of double refraction in the previously described model, it is possible to apply the previously described model.

The relationship between the incident angle and the refractive index vector will be described in a comparative manner with reference to the above-mentioned FIGS. 6A, 6B, 6C and FIG. 10.

In FIG. 6A, axial direction Y of double refraction of uniaxial optical material is configured to be thickness direction of strip-shaped recording medium 65 for hologram. By doing so, there results the state where there is no double refraction with respect to laser beams L perpendicularly incident on the recording medium 65 for hologram. However, there results the state where there is double refraction with respect to laser beams L obliquely incident on the recording medium 65 for hologram. Accordingly, it is necessary to apply the relationship between direction of linear polarization and direction of the axis along the model of the previously described on-axis hologram optical system.

In FIG. 6B, axial direction Y of double refraction of uniaxial optical material is configured to be a direction of the longer side of recording medium 66 for hologram. By doing so, it is easy that the direction of linear polarization is configured to be the same state as that of the axial direction of double refraction, or perpendicular state thereto with respect to laser beams L incident on the recording medium 66 for hologram. Here, FIG. 10A shows the state of double refraction in the case where incident plane of incident laser beams is in parallel to the direction of the longer side, and FIG. 10B shows the state of double refraction in the case where incident plane of incident laser beams is perpendicular to the direction of the longer side. In FIG. 10A, double refraction n' in the case where laser beams L' are incident at incident angle θ' which is perpendicular to the recording medium for hologram and double refraction n" in the case where laser beams L" are incident at incident angle θ" which is oblique with respect to the recording medium for hologram are different from each other. On the other hand, in FIG. 10B, both double refractions are the same.

In FIG. 6C, axial direction Y of double refraction of uniaxial optical material is configured to be coincided with a direction of the shorter side of the strip-shaped recording medium 67 for hologram. Thereby, it is easy that direction of linear polarization is configured to be the same as axial direction of double refraction or perpendicular thereto with respect to laser beams L incident on the recording medium 67 for hologram. Here, FIG. 10A shows the state of double refraction in the case where incident plane of incident laser beams is in parallel to a direction of the shorter side, and FIG. 10B shows the state of double refraction in the case where incident plane of incident laser beams is perpendicular to a direction of the shorter side. In FIG. 10A, double refraction n' in the case where laser beams L' are incident at incident angle θ' which is perpendicular to the recording medium for hologram and double refraction n" in the case where laser beams L" are incident at incident angle θ" which is oblique with respect to the recording medium for hologram are different from each other. On the other hand, in FIG. 10B; both double refractions are the same.

From the above result, such an approach is employed to use uniaxial optical material as optical material constituting the recording medium for hologram with respect to geometrical shape of strip-shaped recording medium for hologram having the longer side-and the shorter side, etc., and to allow axial direction of that double refraction to be coincided with the longer side or the shorter side, thereby making it possible to univocally determine polarization state of the hologram recording unit also in the off-axis hologram optical system where laser beams are obliquely incident on the recording medium for hologram. Accordingly, unification and standardization can be made in both hologram recording unit and recording medium for hologram. Thus, mass production can be carried out and reduction in cost can be realized.

While the example where reference light is passed/emitted through the base and is incident on the hologram recording layer, and object light is passed/emitted through the protective layer and is incident on the hologram recording layer has been explained, it is needless to say that there may be made change into the example where reference light and object light are exchanged, and object light is passed/emitted through the base and is incident on the hologram layer, and reference light is passed/emitted through the protective layer and is incident on the hologram recording layer.

Figure 11:
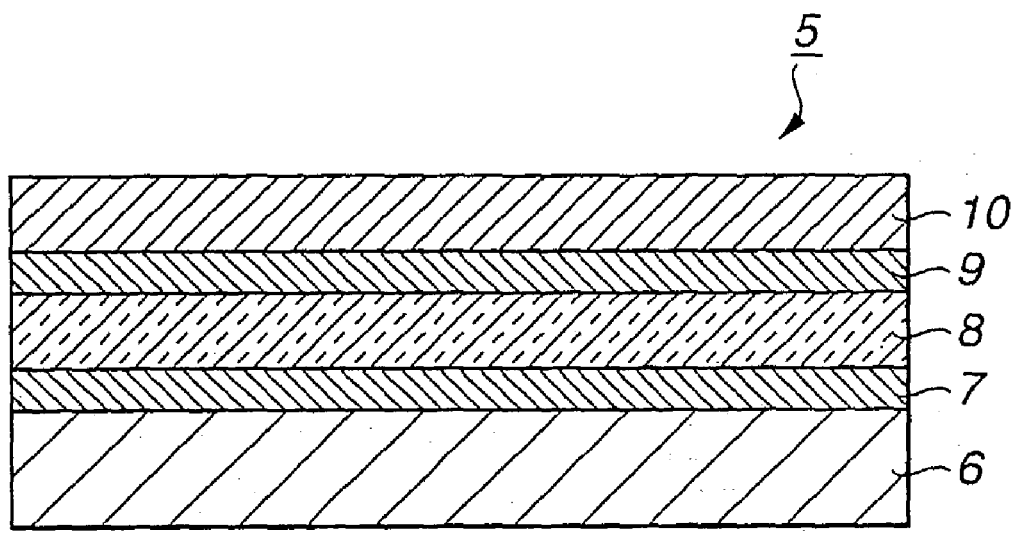
FIG. 11 is a cross sectional view of recording medium for hologram of five layer structure comprising two hologram recording layers.
Figure 12:
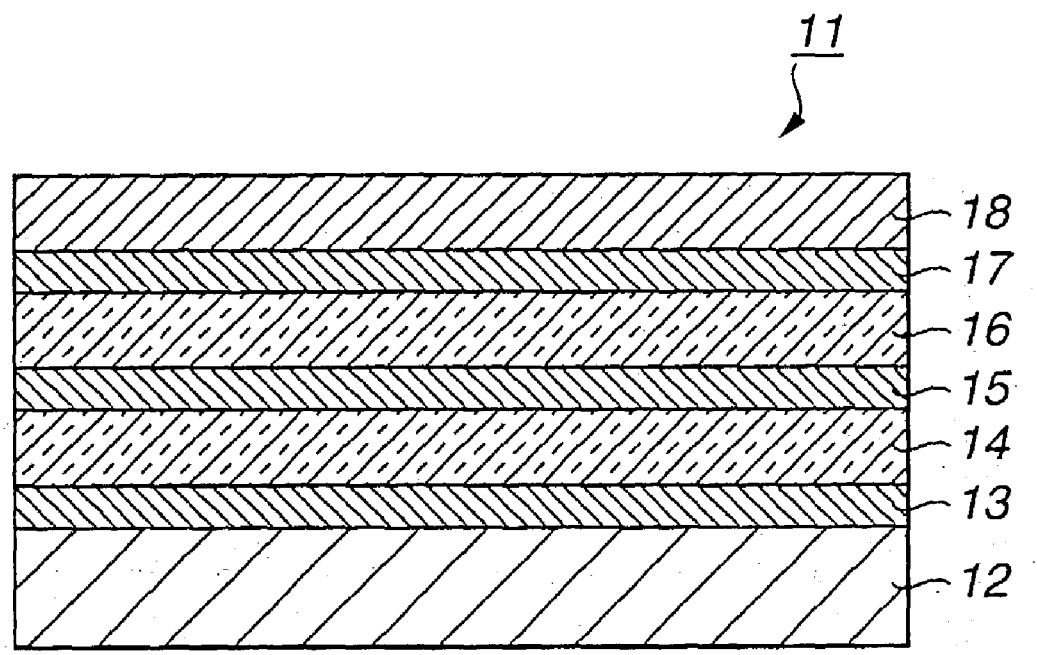
FIG. 12 is a cross sectional view of recording medium for hologram of seven layer structure comprising three hologram recording layers.

In addition, while explanation has been given in connection with the recording medium for hologram consisting of three layers of the base, the hologram recording layer and the protective layer, there may be employed recording media for hologram consisting of five and seven layers of base, hologram recording layer, intermediate layer and protective layer, etc. as shown in FIGS. 11 and 12, respectively. Also in this case, it is desirable that the relationship of double refraction, polarization and geometrical shape of the intermediate layer is configured to be the same as the relationship of double refraction, polarization and-geometrical shape of the above-described base and protective layer.

Explanation will be given in connection with other two more practical examples of recording media for-hologram with reference to FIGS. 11 and 12. First, recording medium 5 for hologram shown in FIG. 11 is a recording medium of five layers obtained by forming a first hologram recording layer 7 consisting of photo-polymer layer on a base 6 to form a second hologram recording layer 9 through an intermediate layer 8 consisting of colorless and transparent resin film layer thereon to further form a protective layer 10 thereon.

Also in this recording medium 5 for hologram, it is similarly desirable to employ material called non-double refraction optical polymer as described above as the base 6, the intermediate layer 8 and the protective layer 10. Furthermore, axial direction of double refraction of materials of the base 6, the intermediate layer 8 and the protective layer 10 is configured to be coincided with the geometrical shape of the photo-polymer film used as the hologram recording layers in a manner as stated above.

In addition, axial direction of double refraction of materials of the base 6, the intermediate layer 8 and the protective layer 10 is configured to be coincided with polarization of reference light and object light at the exposure processing unit of the holographic stereogram preparing apparatus.

Thus, also in this recording medium 5 for hologram, it is possible to generate bright and uniform holographic stereogram without lowering contrast of interference patterns formed at the hologram recording layer comprised of photo-polymer layer.

Furthermore, a recording medium 11 for hologram shown in FIG. 12 is a recording medium of seven layers obtained by forming a first hologram recording layer 13 comprised of photo-polymer layer on a base 12 to form a second hologram recording layer 15 through an intermediate layer 14 comprised of colorless and transparent resin film layer thereon to further form thereon a third hologram recording layer 17 through an intermediate layer 16 thereafter to form a protective layer 18 thereon.

Also in this recording medium 11 for hologram, it is desirable to employ material called non-double refraction optical polymer as described above as the base 12, the intermediate layers 14 and 16, and the protective layer 18.

Furthermore, axial direction of double refraction of materials of the base 12, the intermediate layers 14 and 16, and the protective layer 18 is configured to be coincided with the geometrical shape of the photo-polymer film used as the hologram recording layers 13, 15 and 17 as described above.

Furthermore, axial direction of double refraction of materials of the base 12, the intermediate layers 14 and 16, and the protective layer 18 is configured to be coincided with polarization of reference light and object light at the exposure processing unit of the holographic stereogram preparing apparatus in a manner as described above.

Also in this recording medium 11 for hologram, it is therefore possible to generate bright and uniform holographic stereogram without lowering contrast of interference patterns formed at the hologram recording layer comprised of photo-polymer layer.

It is to be noted that the hologram recording layers of the multi-layer structure shown in FIGS. 11 and 12 have excellent characteristic with respect to wavelength of three primary colors of R, G, B and are used for generating color holographic stereogram.

Furthermore, while the recording medium for hologram composed of base, hologram recording layer, intermediate layer and protective layer has been described above, there may be provided adhesive layers between respective layers for the purpose of bonding or adhering respective layers. At this time, from an optical point of view in the present invention, it can be considered that adhesive layers put between respective layers contribute to double refraction in one body as a portion of the base, the intermediate layer or the protective layer respectively adjacent. Namely, the above-mentioned model can be applied as layer which provides phase change in one body.

In addition, while explanation has been given by using photo-polymer as photosensitive material of the hologram recording layer, the present invention is not limited to such material. There may be used other photosensitive material such as silver salt material or gelatin dichromate, etc.

INDUSTRIAL APPLICABILITY

By using the present invention as described above, it is possible to record bright and uniform hologram without lowering contrast of interference patterns formed at the hologram recording layer comprised of photo-polymer layers.

The invention claimed is:

1. A hologram producing apparatus comprising:
a supply unit for a recording medium for hologram, and
an exposure unit for irradiating object light and reference light onto a recording medium for hologram supplied from the supply unit to record hologram, wherein
the recording medium for hologram comprises a hologram recording layer on which hologram is recorded, and a base and a protective layer between which the hologram recording layer is put, and the recording medium for hologram is formed in rectangular shape, the base and the protective layer comprise material through which light is transmitted and in which an axial direction of that double refraction is perpendicular or nearly perpendicular to the longer side of the rectangular shape and the thickness of the protective layer,
the object light and the reference light that the exposure unit irradiates are linearly polarized light polarized in a direction equal or nearly equal to the axial direction of double refraction or in a direction perpendicular or nearly perpendicular to the axial direction of double refraction.

2. A method of preparing a recording medium for hologram comprising a hologram recording layer in which object light indicating a picture image to be recorded and reference light are irradiated so that hologram is recorded, and other layer laminated on the hologram recording layer, wherein
a shape of the recording medium for hologram is configured to be rectangular, and
the other layer comprises material through which light is transmitted, and in which an axial direction of double refraction is perpendicular or nearly perpendicular to the longer side of the rectangular shape and the thickness of the other layer, and
the object light and the reference light are linearly polarized in a direction equal or nearly equal to the axial direction of double refraction or in a direction perpendicular or nearly perpendicular to the axial direction of double refraction.

3. A hologram producing method of supplying a recording medium for hologram from a supply unit to irradiate object light and reference light onto the recording medium for hologram to thereby produce hologram, wherein
the recording medium for hologram comprises a hologram recording layer on which hologram is recorded, and other layer laminated on the hologram recording layer, and is formed into a rectangular shape and the thickness of the other layer,
the other layer comprises material through which light is irradiated and in which an axial direction of double refraction is perpendicular or nearly perpendicular to the longer side of the rectangular shape, and linearly polarized light polarized in a direction equal or nearly equal to the axial direction of double refraction or in a direction perpendicular or nearly perpendicular to the axial direction of double refraction is used as the object light and the reference light.

* * * * *